US 8,595,184 B2

(12) United States Patent
Zeng et al.

(10) Patent No.: US 8,595,184 B2
(45) Date of Patent: Nov. 26, 2013

(54) SCALEABLE FAULT-TOLERANT METADATA SERVICE

(75) Inventors: Nanshan Zeng, Beijing (CN); Meng Ye, Beijing (CN); Honghua Feng, Beijing (CN); Junwei Xu, Beijing (CN); Yu-chao Cao, Beijing (CN); Yingjun Yu, Beijing (CN); Lin Song, Beijing (CN)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 12/782,730

(22) Filed: May 19, 2010

(65) Prior Publication Data

US 2011/0289049 A1    Nov. 24, 2011

(51) Int. Cl.
*G06F 7/00* (2006.01)
*G06F 17/00* (2006.01)
*G06F 17/30* (2006.01)

(52) U.S. Cl.
USPC ............................ 707/611; 707/709; 707/737

(58) Field of Classification Search
USPC .................................. 707/610–615, 709, 737
See application file for complete search history.

(56) References Cited

U.S. PATENT DOCUMENTS

| 7,146,377 | B2 | 12/2006 | Nowicki et al. | |
|---|---|---|---|---|
| 7,574,579 | B2 | 8/2009 | Gladwin et al. | |
| 7,657,581 | B2 | 2/2010 | Orenstein et al. | |
| 2009/0327340 | A1 | 12/2009 | Akelbein et al. | |
| 2011/0055494 | A1* | 3/2011 | Roberts et al. ............... | 711/154 |

OTHER PUBLICATIONS

Brandt, et al., "Efficient Metadata Management in Large Distributed Storage Systems", Retrieved at << http://citeseerx.ist.psu.edu/viewdoc/download?doi=10.1.1.13.2537&rep=rep1&type=pdf >>, MSST, Proceedings of the 20th IEEE/11th NASA Goddard Conference on Mass Storage Systems and Technologies (MSST'03), Apr. 7-10, 2003, pp. 1-9.

Zhan, et al., "Metadata Management for Distributed Multimedia Storage System", Retrieved at << http://ieeexplore.ieee.org/stamp/stamp.jsp?tp=&arnumber=4606104 >>, ISECS, Proceedings of the 2008 International Symposium on Electronic Commerce and Security, Aug. 3-5, 2008, pp. 443-447.

Hua, et al., "Scalable and Adaptive Metadata Management in Ultra Large-scale File Systems", Retrieved at << http://ieeexplore.ieee.org/stamp/stamp.jsp?arnumber=04595909 >>, ICDCS, Proceedings of the 2008 The 28th International Conference on Distributed Computing Systems, Jun. 17-20, 2008, pp. 403-410.

(Continued)

*Primary Examiner* — Hosain Alam
*Assistant Examiner* — Navneet K Ahluwalia (57) ABSTRACT

Metadata may be stored in, and retrieved from, a scalable, fault-tolerant metadata service. In one example, metadata is divided into partitions, and each partition is served by one or more nodes. For each partition, a first one of the nodes may handle read and write requests, and the other nodes may handle read requests in the event that the first node is down or is experiencing high load. When a request is made with respect to metadata, a metadata server may identify a node, in the partition to which the metadata is assigned, to which the request is to be made. The entity that is making the request then contacts that node, and requests the read or write on the metadata. In a partition, metadata may be replicated between the first node and the other nodes using a log-based replication protocol.

20 Claims, 8 Drawing Sheets

(56) References Cited

OTHER PUBLICATIONS

Fu, et al., "A Novel Dynamic Metadata Management Scheme for Large Distributed Storage Systems", Retrieved at << http://ieeexplore.ieee.org/stamp/stamp.jsp?tp=&arnumber=4637814 >>, HPCC, Proceedings of the 2008 10th IEEE International Conference on High Performance Computing and Communications, Sep. 25-27, 2008, pp. 987-992.

He, et al., "Symmetric Active/Active Metadata Service for High Availability Parallel File Systems", Retrieved at << http://www.csm.oml.gov/~engelman/publications/he09symmetric.pdf >>, Aug. 25, 2009, pp. 1-36.

Li, et al., "Dynamic Hashing: Adaptive Metadata Management for Petabyte-scale File Systems", Retrieved at << http://storageconference.org/2006/Papers/2006-020-Li.pdf >>, Proceedings of the 14th NASA Goddard / 23rd IEEE (MSST2006) Conference on Mass Storage Systems and Technologies, May 15-18, 2006, 6 pages.

\* cited by examiner

SCALEABLE FAULT-TOLERANT METADATA SERVICE

BACKGROUND

Metadata is often described as "data about data." Metadata can take various forms, which range from simple to complex. In one simple example, a computer file is associated with metadata, which may include the name and type of the file, the creation and last-modified dates, the access permissions, etc. In a more complex example, data follows a complex, multi-layered structure, in which case the metadata may include a schema that defines the structure of the data.

One way to view metadata is that it is merely one kind of data. However, in practice, the management of metadata presents issues that are somewhat different from management of the underlying data to which the metadata relates. The metadata may be accessed more frequently than the underlying data. Moreover, an access failure for metadata may be considered less acceptable than an access failure for ordinary data.

SUMMARY

Metadata may be managed by a system that takes into account the reliability and throughput constraints that apply to metadata. Additionally, the system may be scalable to meet arbitrary conditions concerning the amount of metadata to be stored and the rate at which the metadata is to be used.

Metadata may be divided into partitions. Each partition is assigned to a node or a collection of nodes. Each node is a server that responds to access requests for the metadata. The nodes that serve a partition may include a principal node and, optionally, one or more secondary nodes. The principal node maintains the current true version of the partition. The secondary nodes contain replicas of the partition. Requests to write metadata may be directed to the principal nodes. Requests to read metadata may also be directed to the principal nodes. However, if demands on the system are such that it makes sense to use an additional node to serve metadata requests, than some read requests may be directed to a secondary node, thereby taking some pressure off the principal node.

The partitions themselves may be divided in such a way that the loads on each of the partitions are roughly equal. In one example, balancing the loads means that partitions contain roughly equal amounts of metadata. However, the demand for different kinds of metadata may be different, so that the load across partitions might be balanced by assigning small amounts of high-demand metadata to one partition, and large amounts of low-demand metadata to another partition. The subject matter herein allows for dynamic load balancing, depending on how the metadata is being used.

When an entity submits a request to access metadata, the entity submits the request to a metadata server. The metadata server then identifies the appropriate node to which the requesting entity is to submit the request. Typically, the node to which the request is submitted is the principal node for the partition that handles the requested metadata, although in some cases the node may be one of the secondary nodes. The requesting entity then requests the metadata from the node identified by the metadata server.

Metadata in the partitions may be updated through a log-based replication protocol. In such a protocol, any changes to the current state of the metadata (that is, writes that either add new metadata records or that modify existing metadata records) are directed to the principal node that is responsible for a partition. At sometime after the write is made to the principal node, the principal node sends the write to the secondary nodes, so that the secondary nodes will have the new information. However, the secondary nodes may continue to serve the old information, until the new information has been committed. Each of the nodes maintains a log, where the end of the log indicates which is the current version any data. When the principal node commits the new data, it enters the commit in its log. The principal node then notifies the secondary nodes, which commit the data by entering the commit in their respective logs. The principal and secondary nodes then begin to serve the new data instead of the old data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Metadata is often described as "data about data." There are various types of metadata. For example, in a computer file system, each file is associated with metadata that indicates the name and type of the file, the creation date, the last modified date, the access permissions, etc. This type of information about a file is a relatively simple type of metadata. Other types of metadata are more complex. For example, data may be organized into multi-layered structures, where the structures are described by a schema. When data is organized in this way, the data may only be interpretable with the aid of the metadata. Thus, systems that use this type of complex, structured data typically access the metadata in order to interpret the underlying data that the metadata describe.

One way to view metadata is that it is merely a particular kind of data that can be managed like any other data. However, in practice, the management of metadata presents issues that are somewhat different from management of the underlying data to which the metadata relates. Metadata may be accessed more frequently than the underlying data. Moreover, the consequence of an access failure is greater. For example, a consumer of the underlying data may have a private copy of the underlying data, but may be unable to interpret the data without access to the metadata. Or, an entity may be trying to create data that conforms to a schema defined by the metadata, and thus may be unable to create this data in the correct form unless the entity has access to the metadata. Thus, both the throughput and fault tolerance constraints may be higher for metadata than they are for ordinary data.

In order to provide access to metadata, a scalable, fault tolerant metadata management system may be created. Such a metadata management system may divide a body of metadata into partitions. The dividing of metadata into partitions allows different metadata to be served by different groups of servers. A particular partition may be assigned to a particular group of servers in such a way that the expected volume of requests for that partition is within the capacity of that group to serve such requests. Partitioning is scalable, so if the amount of metadata increases—or if the expected rate of requests for metadata increases—the metadata can be divided into a larger number of partitions, and can then be redistributed across a larger number of servers.

The group of servers that serves each partition of the metadata may contain a principal node and a set of secondary nodes. The principal node may serve write requests. Additionally, the principal node may serve read requests when load on the partition is low. If load on the partition increases beyond the ability of one node to serve read requests effectively, then read requests may be directed to one of the secondary nodes. Secondary nodes contain replicas of the metadata stored on the principal nodes, and allow the metadata management system to scale in order to accommodate times of higher loads.

When entities make requests for metadata (either read requests or write requests), the entities submit these requests to a metadata server. The metadata server knows how the metadata is partitioned, and is thus able to identify the servers that hold the requested metadata. In one example, the metadata is partitioned through a hash function that identifies a particular partition based on some function of the metadata involved in the request. However, the partition could be implemented in any manner. When the metadata server identifies the partition, it may identify a particular node from among the set of nodes that serve that partition. As noted above, normally requests are routed to the principal node that serves a partition, although certain requests may be routed to a secondary node during times of high load. When the node has been identified, the server returns the identity of that node to the requesting entity. The requesting entity then submits its request to the identified node. The node then responds to the request.

Replication of metadata between principal and secondary nodes may be managed through a log-based replication protocol. In one example, when the principal node for a partition receives a write request, it replicates newly-written data to the secondary nodes for the partition. After the data has been replicated, the secondary nodes are in possession of the new data. However, at this time the new data may not be the version of the data that the nodes serve. The nodes may continue to serve the prior version of the data until the principal node commits the new version of the data. The issue of which version constitutes the current version of the metadata may be managed through a commit log, where the current version of an item of metadata is determined by the last log entry that applies to that item of metadata. Thus, after the principal node has received confirmation that the secondary node(s) have received replicated data, the principal node may commit that replicated data by entering the commit into the principal node's commit log. The principal node then communicates the commit to the secondary node(s) which enter the commit into their commit logs and begin to serve the new data in place of the old data.

In one example, a metadata service is used to manage metadata for a search engine indexer. For example, when a web crawler retrieves web pages to be indexed, the crawler may store the web pages, and may also store complex structural information about the web pages. This information about the web pages is a form of metadata. In order for an index builder to build an index of the web pages, the index builder has to access the retrieved pages and the metadata. A metadata service that uses techniques described herein may be used to manage the metadata, thereby allowing an index to be built efficiently, and allowing the indexing process to proceed with little risk that bottlenecks or failures in the retrieval of metadata will bring the indexing process to a halt. However, the management of web page data for an indexing service is merely one example use of a metadata service. The techniques described herein may used in any manner, for any kind of metadata.

Figure 1:
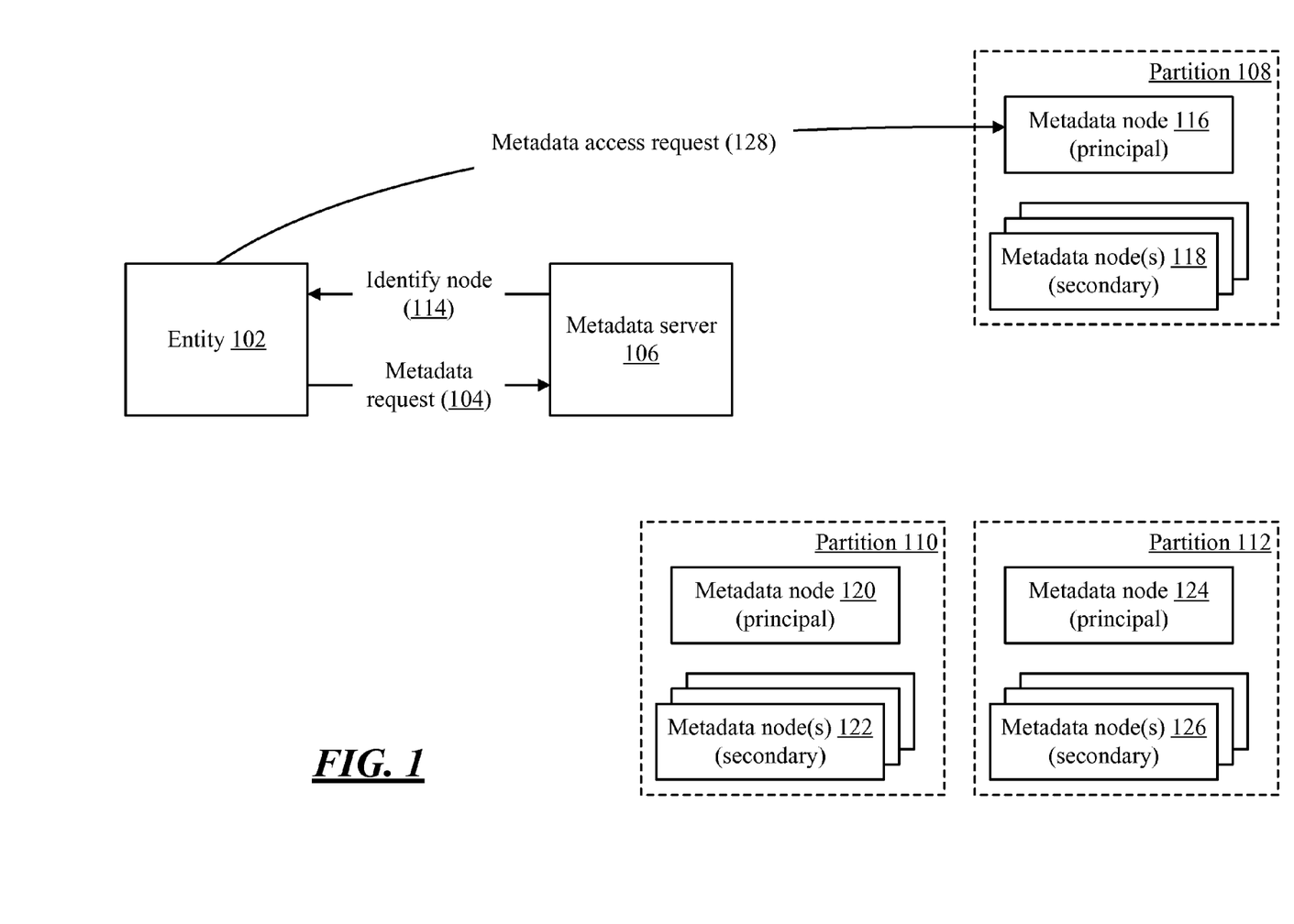
FIG. 1 is a block diagram of an example system that may respond to requests regarding metadata.

Turning now to the drawings, FIG. 1 shows an example system that may respond to requests that concern metadata. The requests that are processed in the system of FIG. 1 may be requests to read, write, or modify metadata. Entity 102 is an entity that issues a request 104 with regard to an item of metadata. Entity 102 may be a user, a program, or any other type of entity. Entity 102 issues request 104 to metadata server 106. Metadata server 106 is aware of a partition of the space of metadata. That is, the space of metadata has been divided into some number of partitions, which are shown in FIG. 1, by way of example, as the three partitions 108, 110, and 112. Given a particular item of metadata or a request for a particular item of metadata, metadata server 106 is able to determine which partition that item of metadata is in. Metadata server 106, in one example, may be a cluster of servers that replicate each other's functions and database to some degree, thereby providing a measure of fault tolerance. (However, the subject matter herein still applies to situations in which metadata server 106 is implemented by a single server.) The metadata may be initially partitioned at the time that the system comes into being, and the metadata may also be repartitioned in order to accommodate load balancing issues, effective use of storage or processing resources, or other considerations.

Each partition is served by one or more distinct metadata nodes. Each metadata node may be implemented by a server. In one example, each partition is served by a principal node and one or more secondary nodes. Thus, partition 108 is served by metadata nodes 116 and 118, with node 116 being the principal node and node(s) 118 being the secondary node. Similarly, partition 110 is served by metadata nodes 120 and 122 (the principal and secondary node(s), respectively), and partition 112 is served by metadata nodes 124 and 126 (the principal and secondary node(s), respectively). The secondary node(s) may replicate the principal node. That is, the principal node may store a true copy of the metadata, and may propagate a copy of that metadata to the secondary nodes. The secondary nodes may serve as backups for the principal nodes. That is, if the principal node is unavailable to process requests due to failure or high load, then requests to read metadata may be directed to the secondary nodes. Various constraints may be imposed on the relationship between different nodes that serve the same partition. For example, one constraint might be that different nodes that serve the same partition are not to be connected to the same network switch, in order to lower the possibility that a partition will be unavailable due to the failure of a single network switch.

When the metadata server identifies, to the requesting entity, the node that serves the partition in which the requested metadata is located, the requesting entity makes a metadata access request 128 at the identified node. The requested access then may be performed. Thus, if entity 102 is requesting to write new metadata (or to write a modification to existing metadata), then entity 102 makes this request to the node identified by metadata server 106. So, if the metadata involved in the request is in partition 108, metadata server 106 might direct entity 102 to metadata node 116, which is the principal node for partition 108. Entity 102 can then write the data to node 116. If, for example, entity 102 is requesting to read metadata that metadata server 106 determines is in partition 108, then metadata server 106 might also direct entity 102 to metadata node 116, since the principal node may handle both read and write requests. However, if metadata node 116 is down, or if it is experiencing a high volume of requests, then entity 102 might be directed to node 118 (one of the secondary nodes for partition 108), since secondary nodes can handle read requests for a partition in the event that those requests cannot be directed to the principal node.

Once entity 102 has made its access request to the appropriate node, that node may process the request by providing the requested metadata to entity 102 (in the case of a read request) or by starting the process to modify the metadata (in the case of a write request). (We say "starting the process" because, as discussed below in connection with FIG. 3, in one example the process of updating the current state of metadata may involve several actions to replicate and commit the data.)

Figure 2:
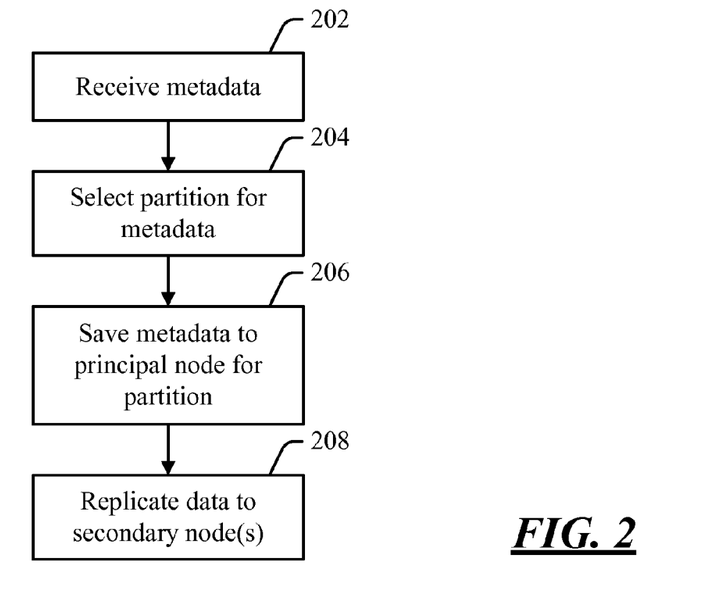
FIG. 2 is a flow diagram of an example process in which metadata may be stored in a metadata system.
Figure 4:
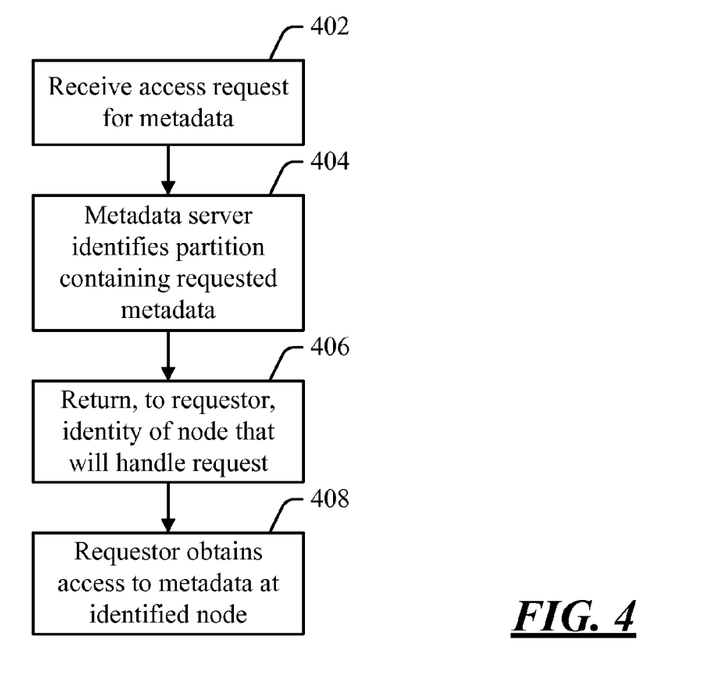
FIG. 4 is a flow diagram of an example process of accessing metadata.
Figure 6:
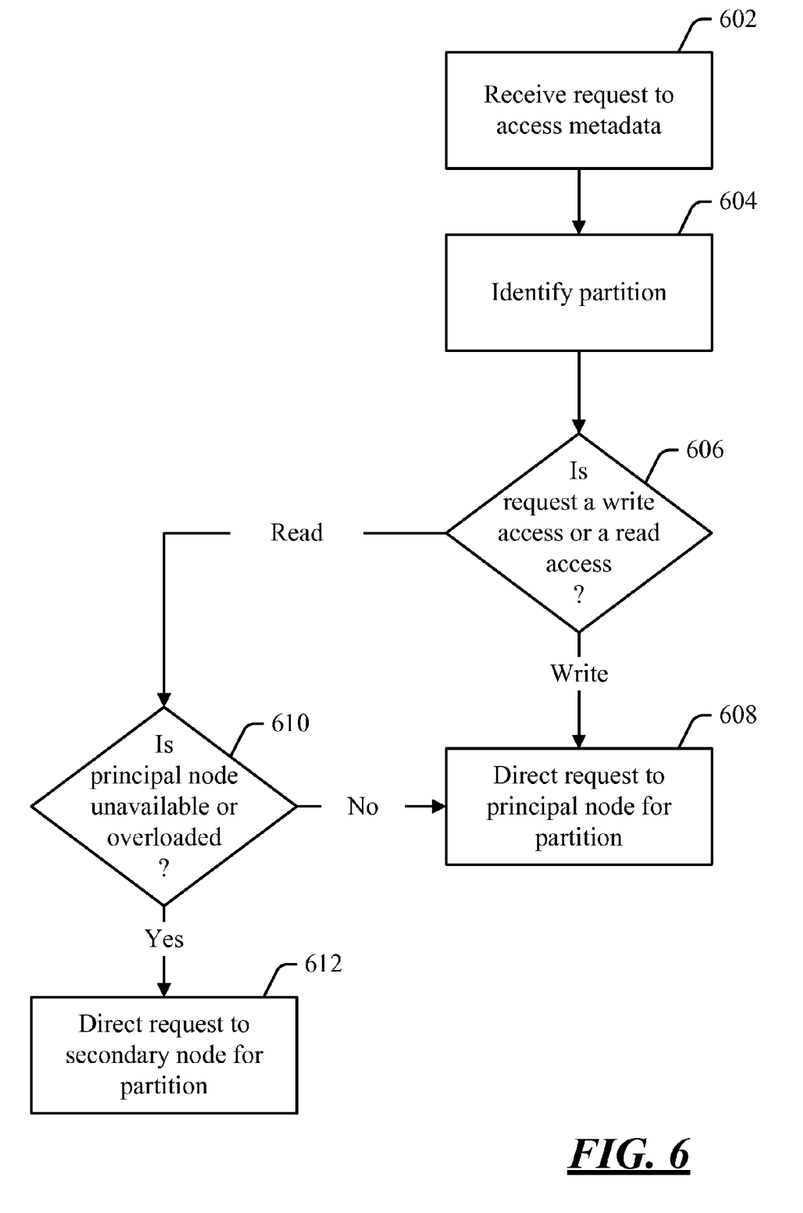
FIG. 6 is a flow diagram of a process that implements one example way in which labor may be divided among the various nodes that serve a partition.

FIG. 2 shows an example process in which metadata may be stored in a metadata system, such as that shown in FIG. 1. The process of FIG. 2 may be used to write new metadata, or to write a modification to existing metadata. Before turning to a description of FIG. 2, it is noted that the flow diagrams contained herein (both in FIG. 2 and in FIGS. 4 and 6) are described, by way of example, with reference to components shown in FIG. 1, although these processes may be carried out in any system and are not limited to the scenario shown in FIG. 1. Additionally, each of the flow diagrams in FIGS. 2, 4, and 6 shows an example in which stages of a process are carried out in a particular order, as indicated by the lines connecting the blocks, but the various stages shown in these diagrams can be performed in any order, or in any combination or sub-combination.

At 202, metadata is received. As noted above, the metadata may be new metadata or may be a modification to existing metadata. At 204, a partition is selected for the metadata. The partition may be selected in any manner. For example, each piece of metadata may be assigned an identifier, and the partition could be selected by assigning different ranges of identifiers to different partitions. Or, the partition could be selected based on a hash of the identifier, or based on some other aspect of the metadata.

At 206, the metadata is saved to the principal node for the partition selected for the metadata. As described above in connection with FIG. 1, in one example, the way in which the metadata reaches the node is that the entity that wants to write the metadata first asks that the metadata server identify a node in a partition to which the metadata has been assigned, and then the entity contacts that node. However, the metadata to be written may reach the identified node in any manner.

After the metadata has been saved, at some point the data may be replicated (at 208). As described above, in one example each partition is served by a principal node and one or more secondary nodes. In that example, the principal node receives data writes, and these writes are replicated to secondary nodes, where the secondary nodes may serve read requests. Thus, the replication involves copying, to the secondary node(s), the data that was written to the principal nodes. There are various ways to accomplish this replication. However, one example way to perform the replication is a log-based replication scheme, which is described with reference to FIG. 3.

Figure 3:
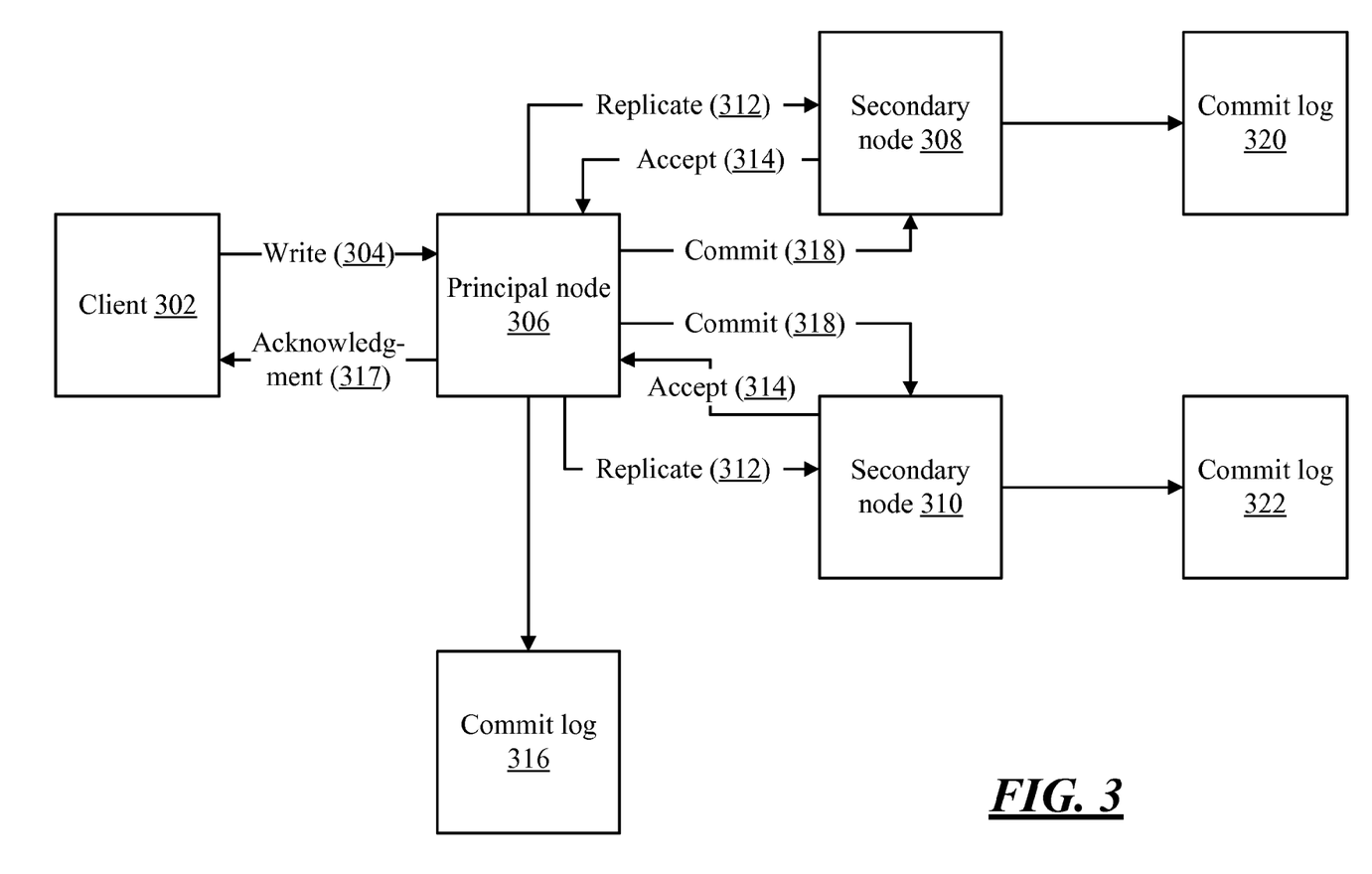
FIG. 3 is a block diagram of an example log-based replication scheme.

In FIG. 3, client 302 issues a write request 304 to a principal node 306. The write request is a request to write new metadata or to update existing metadata. The metadata that is the subject of the request has been assigned to a partition, which is served by principal node 306 and also by secondary nodes 308 and 310.

When write request 304 is received by principal node 306, the metadata that is the subject of the write request is stored on principal node 306. In the example of FIG. 3, there is a distinction between the data that a node stores and the current version of that data. That is, the node may store more than one version of a piece of metadata, but a particular one of those versions is the current version that will be served if a requestor asks for that metadata. The current version may or may not be the most recent version. Thus, when principal node 306 receives the metadata, principal node 306 may store the metadata without actually committing the metadata as being the current version of the metadata.

At some point, principal node 306 replicates 312 the new metadata to secondary nodes 308 and 310. Replication refers to the act of copying the data from principal node 306 to secondary nodes 308 and 310. After the data has been replicated, secondary nodes 308 and 310 accept the metadata (at 314), thereby indicating to principal node 306 that they have received and stored the data. At this point, the principal and secondary nodes are in possession of the written metadata, but have not committed the data. The fact that the data has not been committed means that if the write was an update to existing metadata, the nodes will continue to serve the prior version of the metadata rather than the new version. Or, if the metadata is a new item of metadata (rather than an update to an existing item), then the nodes will not serve the metadata at all. That is, the write will not be considered to be part of the true state of the metadata until the written data has been committed.

After the secondary nodes have provided acknowledgement or indication of their acceptance of the metadata, the principal node may commit the data. Each node maintains a commit log. In one example, the current state of the metadata may be determined by reading the log from the bottom up. That is, suppose there is an item of metadata with the identifier 12345. At some point, a commit log might say, in effect, "current version of metadata #12345 is version A." At some later point in the log, the log might say, "current version of metadata #12345 is version B." Thus, the current version of the metadata is version B, since the current version may be determined by the last entry in the log that relates to a particular piece of metadata. (In this example, each piece of metadata may be identified separately; however, a log entry could refer to categories of metadata rather than single items of metadata.)

Thus, in order to commit the write operation, principal node 306 enters the commit of the new metadata into its commit log 316. At that point, the newly-written metadata is part of the current state of the metadata, from the perspective of principal node 306. From that point in time, if principal node 306 receives a read request for the newly-written metadata, principal node 306 will respond with the new metadata, since that metadata is now part of the current true state of the metadata. Principal node 306 then acknowledges the write to client 302 at 317. Additionally, at 318 principal node 306 sends secondary nodes 308 and 310 a notification that principal node 306 has committed the write, and instructs secondary nodes 308 and 310 to do the same. Upon receipt of notification that principal node 306 has committed the write, secondary nodes 308 and 310 enter the commit into their respective commit logs 320 and 322. At that point, secondary nodes 308 and 310 also recognize the newly-written metadata as being part of the current state of the metadata.

FIG. 4 shows an example process of accessing metadata in a metadata system, such as the system shown in FIG. 1. The access request may be a read request or a write request.

At 402, an access request for metadata is received. This request may be received, for example, by metadata server 106 (shown in FIG. 1). At 404, the entity that received the request (e.g., metadata server 106) identifies the partition that contains (or that will contain) the metadata that is the subject of the request. At 406, the identity of the node that will handle the request is returned to the requestor. At 408, the requestor obtains access to metadata (e.g., read access, write access, etc., in accordance with the request) at the identified node.

Figure 5:
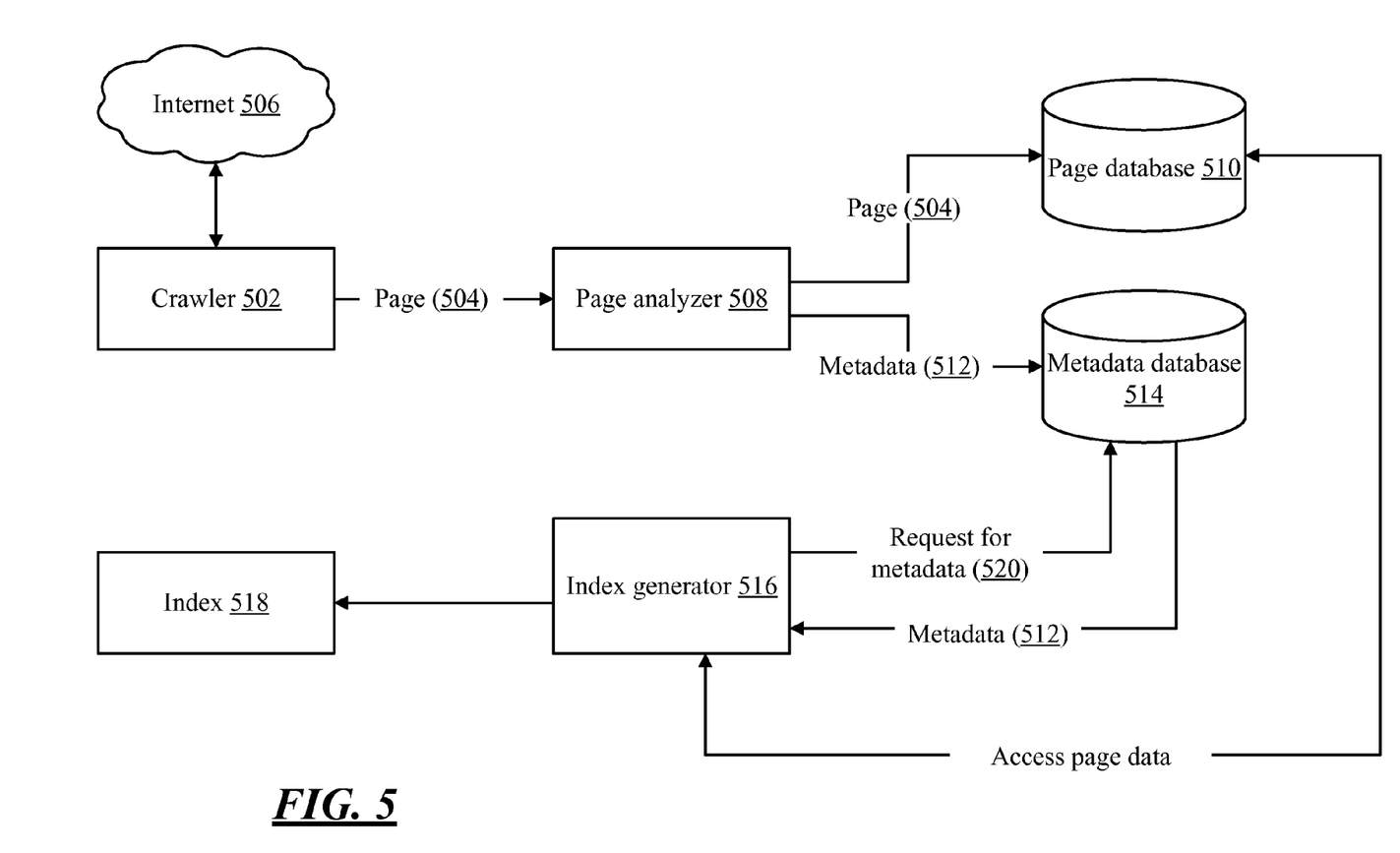
FIG. 5 is a block diagram of an example scenario in which metadata is used to build an index.

As noted above, the techniques described herein may be used to manage any type of metadata that is used for any purpose. However, in one example, these techniques are used to manage metadata that is used to build a search index. A search index of a large corpus of documents, such as the web, is built by first crawling the web and building models of pages that exist. An indexer then analyzes the modeled pages and builds an index based on that analysis. The models of the pages are described in metadata. For example, for a given web page, metadata may be used to describe the type of content on the web page (e.g., whether the page contains text, an image, a script, etc.), the location of pieces of content (e.g., an image appears on the page starting at the 500-th byte), structural information about the page, etc. Thus, the indexer makes use of metadata that is stored about the pages that the crawler returns. FIG. 5 shows an example scenario in which such metadata may be used to build an index.

In FIG. 5, crawler 502 locates and returns web pages 504 from the internet 506. Crawler 502 provides these pages to a page analyzer 508. Page analyzer 508 stores the pages 504, or information derived from the pages, in a page database 510. Additionally page analyzer 508 creates metadata 512 concerning the pages 504 (or concerning information derived from pages 504). Page analyzer 508 may store metadata 512 in metadata database 514. As described above, metadata 512 may contains various types of information about pages 504.

Index generator 516 is a component that builds an index 518 based on the pages that crawler 502 has retrieved. Index generator 516 issues a request 520 for metadata. Metadata database 514 returns the requested metadata 512 to index generator 516. Metadata database 514 can return metadata 512 in any manner. However, in one example, metadata database 514 uses some or all of the components described above in connection with FIG. 1.

Index generator 516 accesses page data in page database 510, and uses metadata 512 to interpret the page data. Index generator 516 then performs an analysis on the page data, and uses this analysis to build index 518.

As mentioned above, there may be a division of labor among different nodes that serve the same partition. FIG. 6 shows a process that implements one example way in which labor may be divided among the various nodes that serve a partition.

At 602, a request to access metadata is received. At 604, a partition is identified that handles the particular metadata that is the subject of the request. At 606, it is determined whether the request is a read request or a write request. As noted above, in one example write requests are handled by the principal node for a partition, but read requests may be handled by either the principal node or a secondary node. Thus, if the request is a write request, then—by virtue of the request being a write request—the request is directed to the principal node for the partition (block 608). "Directing" a request to a particular node may comprise, for example, informing the entity that made the metadata request of which node will handle the request (so that the entity can then contact the appropriate node).

If the request is a read request, then it may be determined (at 610) whether the principal node is unavailable or overloaded. In general, the principal node may handle both read and write requests if it is able to do so, but read requests may be directed to a secondary node in the event that the principal node is unavailable, or if load on the principal node is high. Thus, if the principal node is unavailable or overloaded, the request may be directed to a secondary node (at 612). Otherwise, the request may be directed to the principal node (at 610).

In a large cluster of machines, it is normal to lose some machines for reasons such as hardware failure or software crash. In order to maintain high availability of a metadata partition in the face of random machine failure, for the same partition, the metadata server may acquire set of nodes for a partition and may distribute these nodes so that they do not share the same switch, power supply, etc. As noted above, in the multiple replicas of one partition, one of the nodes is the principal node and other nodes are the secondary nodes.

As also noted above, write operations are handled by the principal node. Thus, if the principal node fails, thereby leaving a partition with only secondary nodes, then writes for the partition cannot be committed. So, if the principal node fails, the metadata server will upgrade one secondary node to become the principal node. If, after the upgrade, the partition does not have enough secondary nodes, the metadata server will add a new node to join the partition's node set and take the secondary. The new secondary will learn the data from the principle node or the existing secondary node(s).

The metadata server monitors the state of the metadata storage nodes. The more replicas the partition loses, the greater the risk that partition data will be lost. So, the metadata server ensures that all the partitions have the enough replicas.

Figure 7:
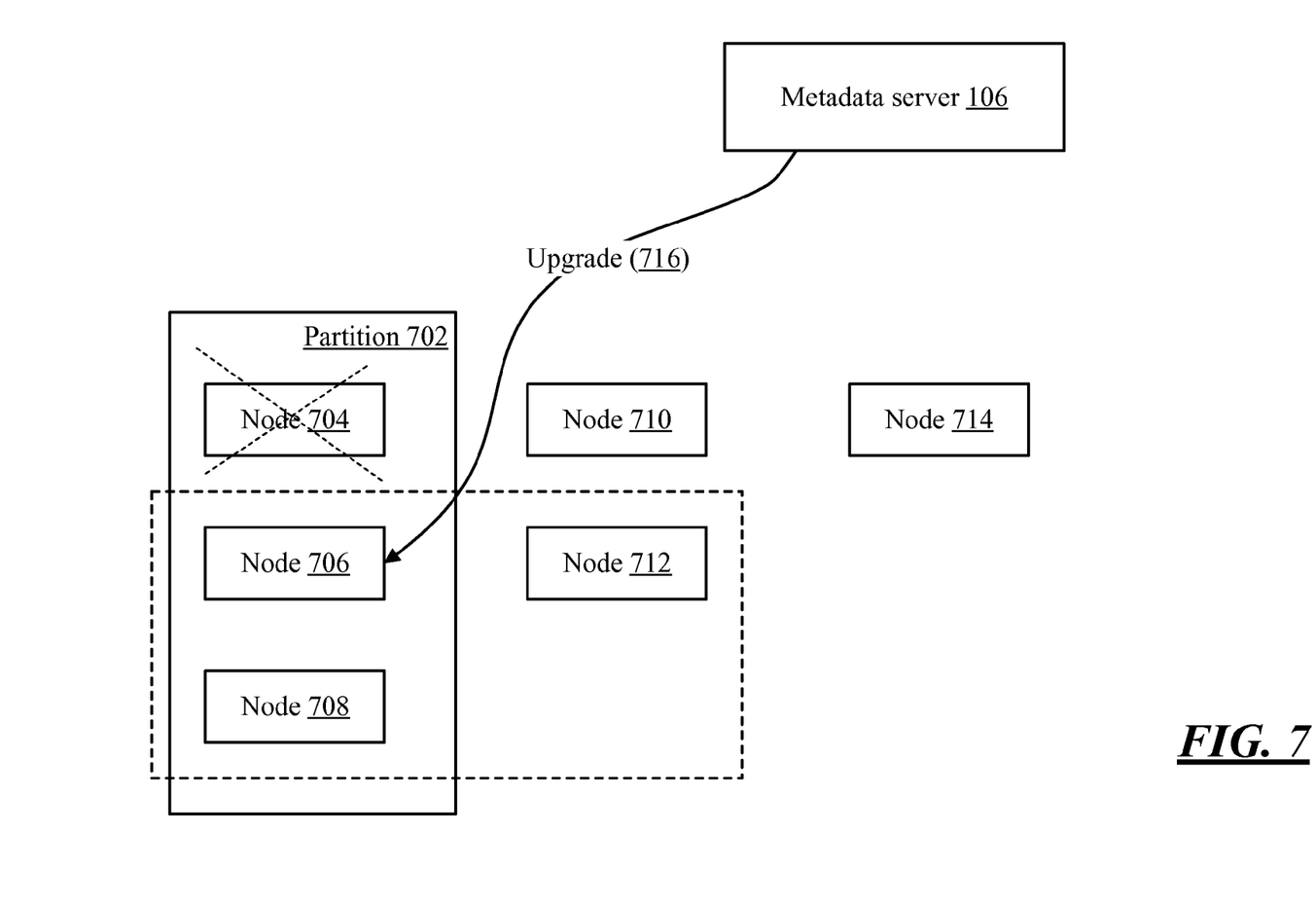
FIG. 7 is a block diagram of an example process of acquiring a new node for a partition in the event of node failure.

This process is shown in FIG. 7. In the example of FIG. 7, partition 702 is one of the partitions managed by metadata server 106. Metadata server 106 has a number of different nodes that it can assign to partitions. In FIG. 7, nodes 704, 706, 708, 710, 712, and 714 are shown. Initially nodes 704-708 are assigned to partition 702, with node 704 being the principal node and nodes 706 and 708 being secondary nodes. At some point, node 704 becomes unavailable—e.g., due to hardware failure, software failure, network connectivity failure, or for some other reason—as indicated by the dotted "X" over node 704. Thus, in order to ensure that partition 702 has a principal node, metadata server 106 upgrades (716) node 706 from being a secondary node to being the principal node. Additionally, in order to ensure that partition 702 is served by a sufficient number of secondary nodes, metadata server assigns node 712 to act as a secondary node for partition 702. At that point in time, the set of nodes that serves partition 702 changes from nodes 704, 706, and 708 (as indicated by the solid line boundary) to being nodes 706, 708, and 712 (as indicated by the dotted line boundary).

In addition to the problem of node failure, the subject matter described herein can address the issue of growth of metadata. As noted above, metadata may be repartitioned after an initial partitioning of the metadata. One circumstance in which metadata may be repartitioned is where the amount of metadata grows to the point that it is no longer practical to serve a given partition on its currently-assigned set of nodes. When this circumstance occurs, a metadata server may instruct the existing nodes to split the partition that they serve, and to move one of the resulting partitions to a new set of nodes. In this way, the subject matter herein can dynamically adapt to an increasing data volume and access load by adding more machines to serve the metadata.

Figure 8:
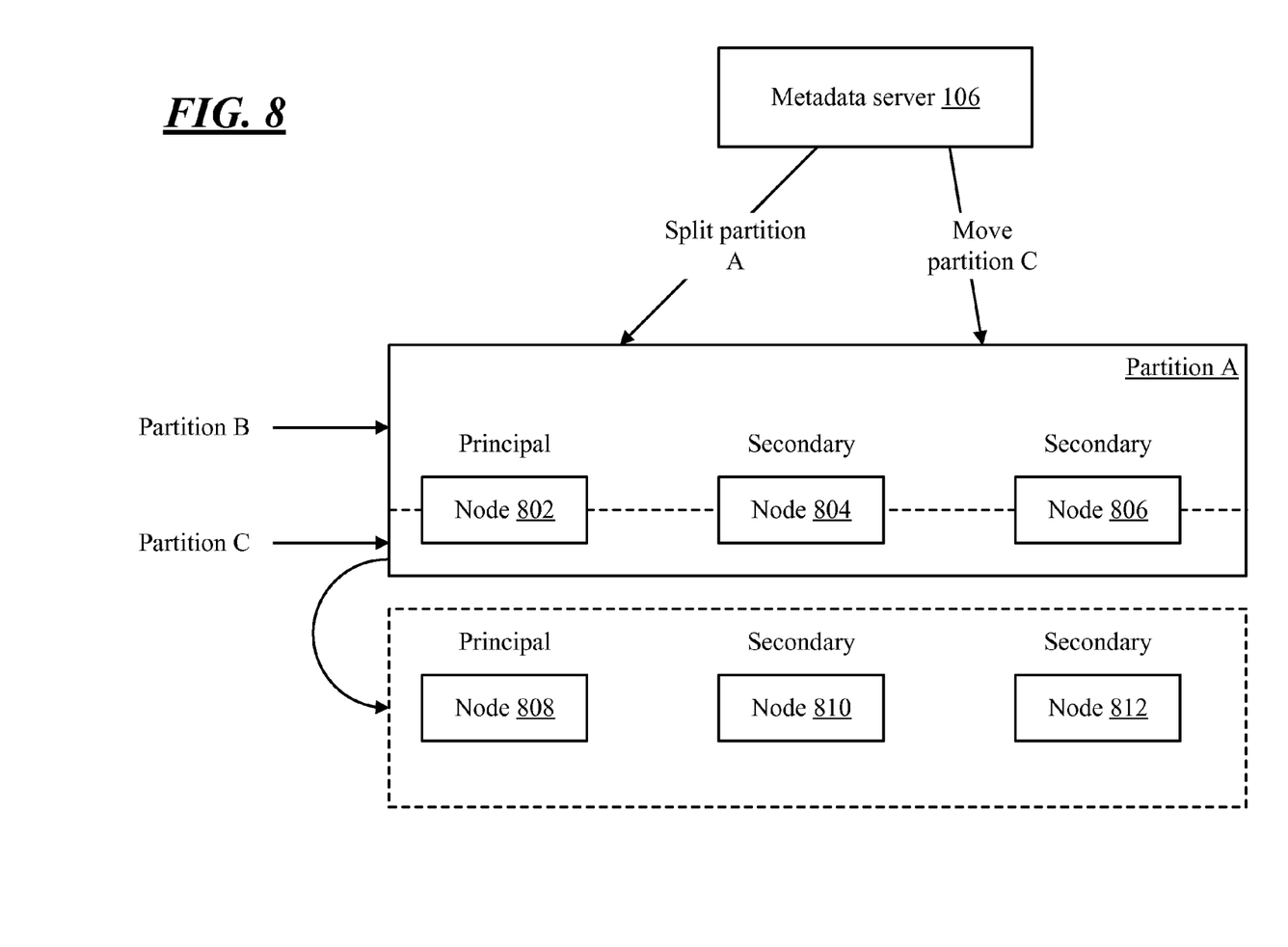
FIG. 8 is a block diagram of an example process of splitting a partition to accommodate growth of the partition.

The process of splitting a partition and adding new nodes is shown in FIG. 8. In FIG. 8, partition A is initially served by three nodes 802, 804, and 806. In this example, node 802 is the principal node, and nodes 804 and 806 are secondary nodes. At some point, partition A acquires much more data than it initially had, which leads to a higher load of access requests than it is practical to serve with nodes 802-806. Thus, metadata server 106 may instruct nodes 802-806 to split partition A into two new partitions, B and C (as indicated by the horizontal dotted line across partition A). Additionally, once partition A has been split into B and C, metadata server 106 may instruct nodes 802-806 to move partition C to a new set of nodes 808, 810, and 812. Once this move has occurred, nodes 808-812 will serve partition C (with node 808 being the principal node, and nodes 810 and 812 being the secondary nodes, for partition C). Additionally, nodes 802-806 will now serve partition B (with node 802 being the principal node, and nodes 804 and 806 being the secondary nodes, for partition B).

Figure 9:
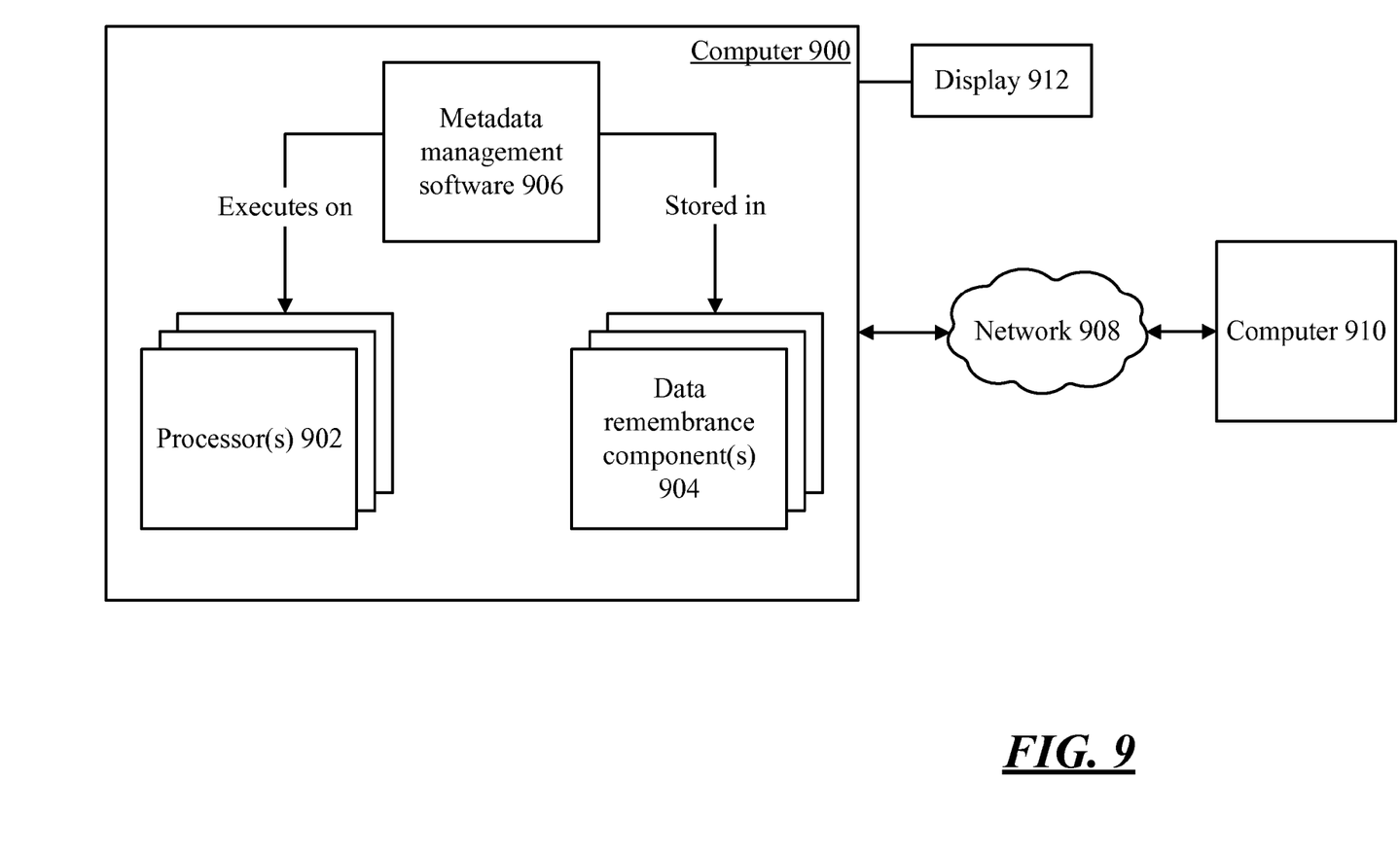
FIG. 9 is a block diagram of example components that may be used in connection with implementations of the subject matter described herein.

FIG. 9 shows an example environment in which aspects of the subject matter described herein may be deployed.

Computer 900 includes one or more processors 902 and one or more data remembrance components 904. Processor(s) 902 are typically microprocessors, such as those found in a personal desktop or laptop computer, a server, a handheld computer, or another kind of computing device. Data remembrance component(s) 904 are components that are capable of storing data for either the short or long term. Examples of data remembrance component(s) 904 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 900 may comprise, or be associated with, display 912, which may be a cathode ray tube (CRT) monitor, a liquid crystal display (LCD) monitor, or any other type of monitor.

Software may be stored in the data remembrance component(s) 904, and may execute on the one or more processor(s) 902. An example of such software is metadata management software 906, which may implement some or all of the functionality described above in connection with FIGS. 1-6, although any type of software could be used. Software 906 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 9, although the subject matter described herein is not limited to this example.

The subject matter described herein can be implemented as software that is stored in one or more of the data remembrance component(s) 904 and that executes on one or more of the processor(s) 902. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 902) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 900 may be communicatively connected to one or more other devices through network 908. Computer 910, which may be similar in structure to computer 900, is an example of a device that can be connected to computer 900, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable disks or memories that store executable instructions to handle metadata, wherein the instructions, when executed by a computer, cause the computer to perform acts comprising:
   receiving, from an entity, a request concerning an item of metadata;
   identifying a partition that stores said item of metadata, wherein a body of metadata is divided into a first plurality of partitions, said partition being one of said first plurality of partitions;
   providing, to said entity, an identity of a node that handles requests for said partition;
   receiving at said node, from said entity, said request;
   reading or writing said item of metadata in accordance with said request; each of said first plurality of partitions being served by a first node and by a second node that is distinct from said first node, and said identifying comprising:
   identifying only said first node when said request comprises a write request;
   identifying either said first node or said second node when said request comprises a read request;
   splitting said first one of said first plurality of partitions into a second partition and a third partition, said first node being assigned to said second partition, said second node being assigned to said third partition;
   determining that said third partition contains only nodes that can handle read requests and does not contain any nodes that can handle write requests; and
   upgrading said second node to being a node that can handle both read requests and write requests for said third partition.

2. The one or more computer-readable disks or memories of claim 1, wherein each of said first plurality of partitions is served by said first node and by said second node, and wherein said acts further comprise:

copying said item of metadata from said first node to said second node;

receiving, from said second node, an acknowledgement that said item of metadata has been received by said second node;

sending, to said second node from said first node, an instruction to commit said item of metadata; and only after said instruction to commit is received, serving said item of metadata from said second node.

3. The one or more computer-readable disks or memories of claim 2, wherein said first node maintains a first log, wherein said second node maintains a second log that is distinct from said first log, wherein said instruction to commit causes said second node to enter said item of metadata into said second log, and wherein said first node and said second node each determine whether to serve said item of metadata based on whether said item of metadata is in a given node's respective log.

4. The one or more computer-readable disks or memories of claim 1, wherein each of said first plurality of partitions is served by said first node and by said second node, and wherein said first node and said second node are not connected to a same switch.

5. The one or more computer-readable disks or memories of claim 1, wherein said identifying of either said first node or said second node when said request comprises a read request comprises:

identifying said second node when said first node is unavailable or overloaded; and otherwise identifying said first node.

6. The one or more computer-readable disks or memories of claim 1, further comprising:

repartitioning said metadata from said first plurality of partitions to a second plurality of partitions that is distinct from said first plurality of partitions.

7. The one or more computer-readable disks or memories of claim 6, wherein said repartitioning comprises:

determining that it is not practical for a first group of nodes assigned to said first one of said first plurality of partitions to handle an amount of metadata in said first one of said first plurality of partitions;

said splitting of said first one of said first plurality of partitions into said second partition and said third partition;

assigning said first group of nodes to handle said second partition; and assigning a second group of nodes distinct from said first group of nodes to handle said third partition.

8. The one or more computer-readable disks or memories of claim 1, said item of metadata being assigned an identifier, said partition that stores said item of metadata being identified using a hash of said metadata.

9. A method of accessing metadata, the method comprising:

using a processor to perform acts comprising:

submitting, to a metadata server, a first request concerning an item of metadata;

receiving, from said metadata server, an identity of a first node that serves metadata that has been assigned to a first partition, there being metadata that is divided into a plurality of partitions, said first partition being one of said plurality of partitions, said partition being served by said first node and by a second node, said first request comprising a write request, and wherein said metadata server directs said first request to said first node, and not to said second node, by virtue of said first request being a write request, write requests on said first partition not being directable to any node other than said first node, said first partition being split into a second partition and a third partition, said first node being assigned to said second partition, said second node being assigned to said third partition, a determination being made that said third partition contains only nodes that can handle read requests and does not contain any nodes that can handle write requests, said second node being upgraded to being a node that can handle both read requests and write requests for said third partition; and submitting said first request to said first node, wherein said first request either retrieves said item of metadata from said first node or causes said item of metadata to be written at said first node.

10. The method of claim 9, wherein said metadata server is part of a cluster of metadata servers that replicate some or all of each others' data or function.

11. The method of claim 9, wherein a second request comprises a read request, and wherein said metadata server directs said second request to said first node, and not to said second node, by virtue of said first node not being unavailable or overloaded.

12. The method of claim 9, wherein a second request comprises a read request, wherein said first node serves all write requests for said first partition, and wherein said metadata server directs said second request to said second node, and not to said first node, by virtue of said first node being unavailable or overloaded.

13. The method of claim 9, said first node and said second node not being connected to a same switch.

14. The method of claim 9, wherein said metadata describes pages that have been retrieved by a web crawler, or describes data derived from said pages, and wherein said acts further comprise:

using said metadata to build an index of said pages.

15. The method of claim 9, said item of metadata being assigned an identifier, said first partition being assigned to said item of metadata based on a hash of said identifier.

16. A system for serving metadata, the system comprising:

a memory;

a processor;

a plurality of nodes, there being a plurality of partitions of metadata, wherein each partition is served by:

a first node that is one of said plurality of nodes; and a second node that is one of said plurality of nodes and that is distinct from said first node;

a metadata server that is stored in said memory, that executes on said processor, that assigns metadata to said plurality of partitions, and that directs a request for an item of metadata to said item of metadata's assigned partition; and a plurality of commit logs, wherein each of said plurality of nodes maintains one of the commit logs, wherein each of said nodes stores more than one version of an item of metadata, and wherein each node determines which version of a given item of metadata is current based on whether said item of metadata appears in the node's commit log;

wherein said first node for a given partition serves all write requests for said given partition and also serves read requests for said given partition when said first node is not unavailable or overloaded, said given partition also being served by a second node that serves read requests but not write requests for said given partition, said system splitting said given partition into a first partition and a second partition, said first node being assigned to said first partition, said second node being assigned to said second partition, said system determining that said second partition contains only nodes that can handle read requests and does not contain any nodes that can handle write requests, and said system upgrading said second node to being a node that can handle both read requests and write requests for said second partition.

17. The system of claim 16, further comprising one or more switches, wherein the first node and the second node for a given partition are not connected to a same one of said one or more switches.

18. The system of claim 16, wherein the first node for a given partition replicates metadata that it stores to the second node for the given partition.

19. The system of claim 18, wherein the first node receives, from the second node, an indication that replicated metadata has been received and then, after receiving said indication, instructs the second node to commit the replicated metadata in the second node's commit log.

20. The system of claim 16, wherein said metadata server detects that said first node has failed, assigns said second node to take over said first node's functions, including serving write requests, and assigns a third node, distinct from said first node and from said second node, to act as a secondary node for said partition.

* * * * *